US010085417B2

(12) United States Patent
Miller (10) Patent No.: US 10,085,417 B2
(45) Date of Patent: Oct. 2, 2018

(54) COLLAPSIBLE PET BED WITH REMOVABLY ATTACHABLE COVER

(71) Applicant: Focus Products Group International, LLC, Lincolnshire, IL (US)

(72) Inventor: Brenda K. Miller, Jersey Shore, PA (US)

(73) Assignee: SURE FIT HOME PRODUCTS, LLC, Lincolnshire, IL (US)

( * ) Notice: Subject to any disclaimer, the term of this patent is extended or adjusted under 35 U.S.C. 154(b) by 205 days.

(21) Appl. No.: 15/063,981

(22) Filed: Mar. 8, 2016

(65) Prior Publication Data

US 2017/0258035 A1 Sep. 14, 2017

(51) Int. Cl.
*A01K 1/035* (2006.01)
(52) U.S. Cl.
CPC .................. *A01K 1/0353* (2013.01)
(58) Field of Classification Search
CPC .................................... A01K 1/0353
USPC ........................................ 119/28.5
See application file for complete search history.

(56) References Cited

U.S. PATENT DOCUMENTS

| 877,757 A | 1/1908 | Corning |
| 2,292,540 A * | 8/1942 | Norton ................. A01K 1/0353 |
| | | 119/28.5 |
| 2,778,560 A | 1/1957 | Pfeiffer |
| 2,936,102 A * | 5/1960 | Field ................... A01K 1/0353 |
| | | 119/28.5 |
| 3,006,319 A | 10/1961 | McCrory |
| 4,105,153 A | 8/1978 | Locke |
| 4,198,718 A * | 4/1980 | Ballard ............... A01K 1/0353 |
| | | 119/499 |
| 4,585,159 A | 4/1986 | Travis |
| 4,729,343 A * | 3/1988 | Evans ................. A01K 1/0353 |
| | | 119/28.5 |
| 4,788,935 A | 12/1988 | Bella et al. |
| 5,136,981 A | 8/1992 | Barreto, III et al. |
| | (Continued) | |

FOREIGN PATENT DOCUMENTS

| CA | 2301789 A1 * | 7/2000 | .......... A01K 1/0353 |
| FR | 2388491 A1 | 11/1978 | |
| | (Continued) | | |

OTHER PUBLICATIONS

Ooboo Designs Pet Haven Indoor Folding Dog House, Faux Leather, Extra Small, retrieved from the internet on Nov. 2, 2016, <https://amazon.com/Design-Pet-Haven-Folding-Leather/dp/B0051BXSSE?e=UTF8, 3 pages.

(Continued)

*Primary Examiner* — Tien Q Dinh
*Assistant Examiner* — Ebony E Evans
(74) *Attorney, Agent, or Firm* — Thompson Coburn LLP (57) ABSTRACT

A pet bed has a collapsible frame with front and rear side walls and left, and right side walls, and a bottom. The collapsible frame also comprises a base which may be disposed in an interior of the frame to maintain the front and rear side walls and left and right side walls in a spaced-apart relationship when the frame is in an expanded configuration. A cover is formed from a pliant material and may be configured to be releasably attached to the pet bed. The cover attaches in such a way to cover the inward and outward faces of at least one of the front, rear, left and right side walls.

22 Claims, 6 Drawing Sheets

(56) References Cited

U.S. PATENT DOCUMENTS

| | | | | |
|---|---|---|---|---|
| 5,182,824 | A | * | 2/1993 | Cipriano ................ A47C 17/52 5/181 |
| 5,282,439 | A | * | 2/1994 | Oaks ..................... A01K 1/0353 119/28.5 |
| 5,287,825 | A | * | 2/1994 | Wheeler ................ A01K 1/035 119/513 |
| 5,293,655 | A | * | 3/1994 | VanWinkle .............. A47D 7/04 5/185 |
| 5,465,686 | A | | 11/1995 | Monetti et al. |
| 5,497,729 | A | * | 3/1996 | Lord .................... A01K 1/0218 119/513 |
| 5,588,393 | A | | 12/1996 | Heilborn |
| 5,724,911 | A | | 3/1998 | McAlister |
| 5,881,408 | A | * | 3/1999 | Bashista .............. A47D 15/008 5/663 |
| 6,276,582 | B1 | * | 8/2001 | Alexander .............. B60R 7/043 217/16 |
| 6,409,076 | B1 | | 6/2002 | Wang |
| 6,564,402 | B1 | | 5/2003 | Lin |
| 6,591,778 | B1 | | 7/2003 | Alderman |
| 6,920,993 | B2 | * | 7/2005 | Sheng-Bin ........... A45C 7/0036 220/4.28 |
| 7,011,224 | B2 | | 3/2006 | Sheng-Bin |
| D567,456 | S | | 4/2008 | Martin et al. |
| 7,900,392 | B2 | * | 3/2011 | Musto ................... A01K 97/06 206/315.11 |
| 2004/0031211 | A1 | | 2/2004 | Becker |
| 2004/0134433 | A1 | | 7/2004 | Holder |
| 2004/0148700 | A1 | | 8/2004 | Brereton |
| 2004/0177814 | A1 | | 9/2004 | Godshaw |
| 2004/0194723 | A1 | | 10/2004 | Farmer et al. |
| 2004/0194724 | A1 | | 10/2004 | Wood |
| 2005/0229866 | A1 | | 10/2005 | Simpson et al. |
| 2006/0107902 | A1 | | 5/2006 | Rosen et al. |
| 2006/0162666 | A1 | * | 7/2006 | Mitchell .............. A01K 1/0107 119/168 |
| 2006/0218726 | A1 | * | 10/2006 | Waters .................... A47D 7/00 5/424 |
| 2006/0219181 | A1 | | 10/2006 | Pape et al. |
| 2007/0193522 | A1 | | 8/2007 | Greschler |
| 2008/0127897 | A1 | | 6/2008 | Flannery |
| 2008/0276872 | A1 | | 11/2008 | Chern |
| 2009/0007331 | A1 | | 1/2009 | Lamstein |
| 2009/0031959 | A1 | | 2/2009 | Crowley |
| 2009/0151647 | A1 | * | 6/2009 | Burrows .............. A01K 1/0218 119/513 |
| 2012/0234252 | A1 | | 9/2012 | Donta et al. |
| 2013/0097785 | A1 | | 4/2013 | Cicci |
| 2013/0192533 | A1 | | 8/2013 | Lamke et al. |
| 2013/0298843 | A1 | | 11/2013 | Schouwink |
| 2014/0075670 | A1 | | 3/2014 | Crumrine |
| 2014/0117072 | A1 | * | 5/2014 | Cullen ............... B65D 11/1853 229/117.05 |
| 2014/0305379 | A1 | | 10/2014 | Ballentyne |
| 2015/0107526 | A1 | | 4/2015 | Lemon |

FOREIGN PATENT DOCUMENTS

| | | | | |
|---|---|---|---|---|
| FR | 2514990 | A1 | | 4/1983 |
| GB | 394023 | A | | 6/1933 |
| GB | 413807 | A | * | 7/1934 ........... A01K 1/0353 |
| GB | 506795 | A | | 6/1939 |
| GB | 728570 | A | | 4/1955 |
| GB | 955581 | A | | 4/1964 |
| GB | 1274337 | A | | 5/1972 |
| GB | 2446361 | A | | 8/2008 |
| WO | 97/47185 | A1 | | 12/1997 |
| WO | WO-2007038511 | A2 | * | 4/2007 ........... A01K 1/0353 |

OTHER PUBLICATIONS

Portable Dog House Image/Advertisment, retrieved from the internet on Jan. 5, 2016, <http://ecx.image-amazon.com/image/l/51mHwVbjHuL._SY300_.jpg.

"Turn an Ordinary Cardboard Box into a Sylish DIY Cat Bed", Oct. 21, 2015, https://web.archive.org/web/20151022033443/https://theantijunecleaver.com/2015/10/diy-cat-bed/ retreived from the Internet on Jan. 1, 2018, 24 pages.

* cited by examiner

COLLAPSIBLE PET BED WITH REMOVABLY ATTACHABLE COVER

BACKGROUND AND SUMMARY

The present disclosure relates to a collapsible pet bed having a removably attachable cover. The pet bed has a frame which is collapsible and the cover extends over at least a portion of the inward faces of the frame and over at least a portion of the outward faces of the frame. The cover may be cushioned. The collapsible pet bed and its components, including the cover, may be stored in the carrying tote thereby allowing the pet bed to be portable.

DETAILED DESCRIPTION

Figure 1:
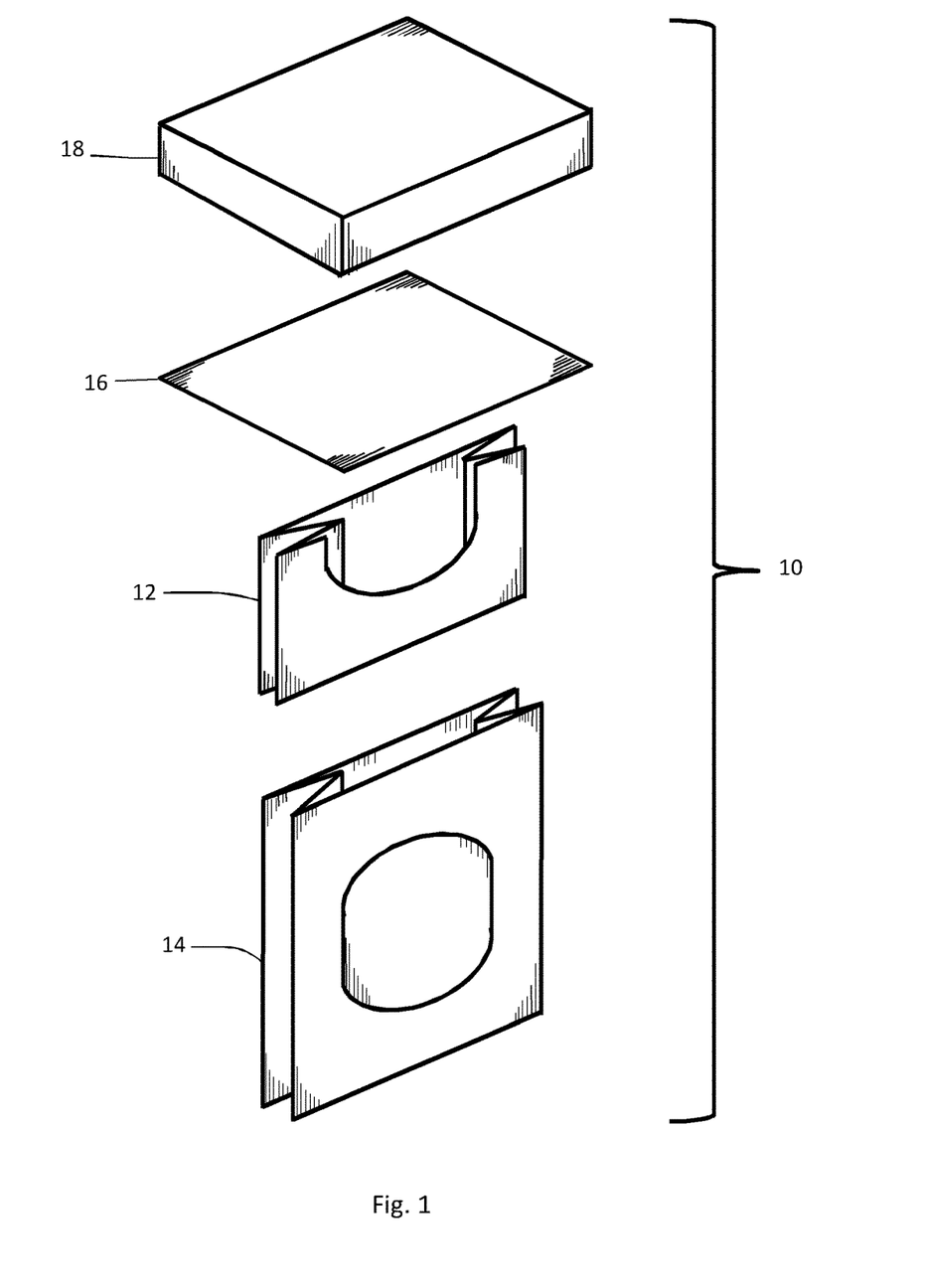
FIG. 1 shows an exploded view of the components of the pet bed including a cushion, a base, a frame (in a collapsed arrangement), and a cover.
Figure 2:
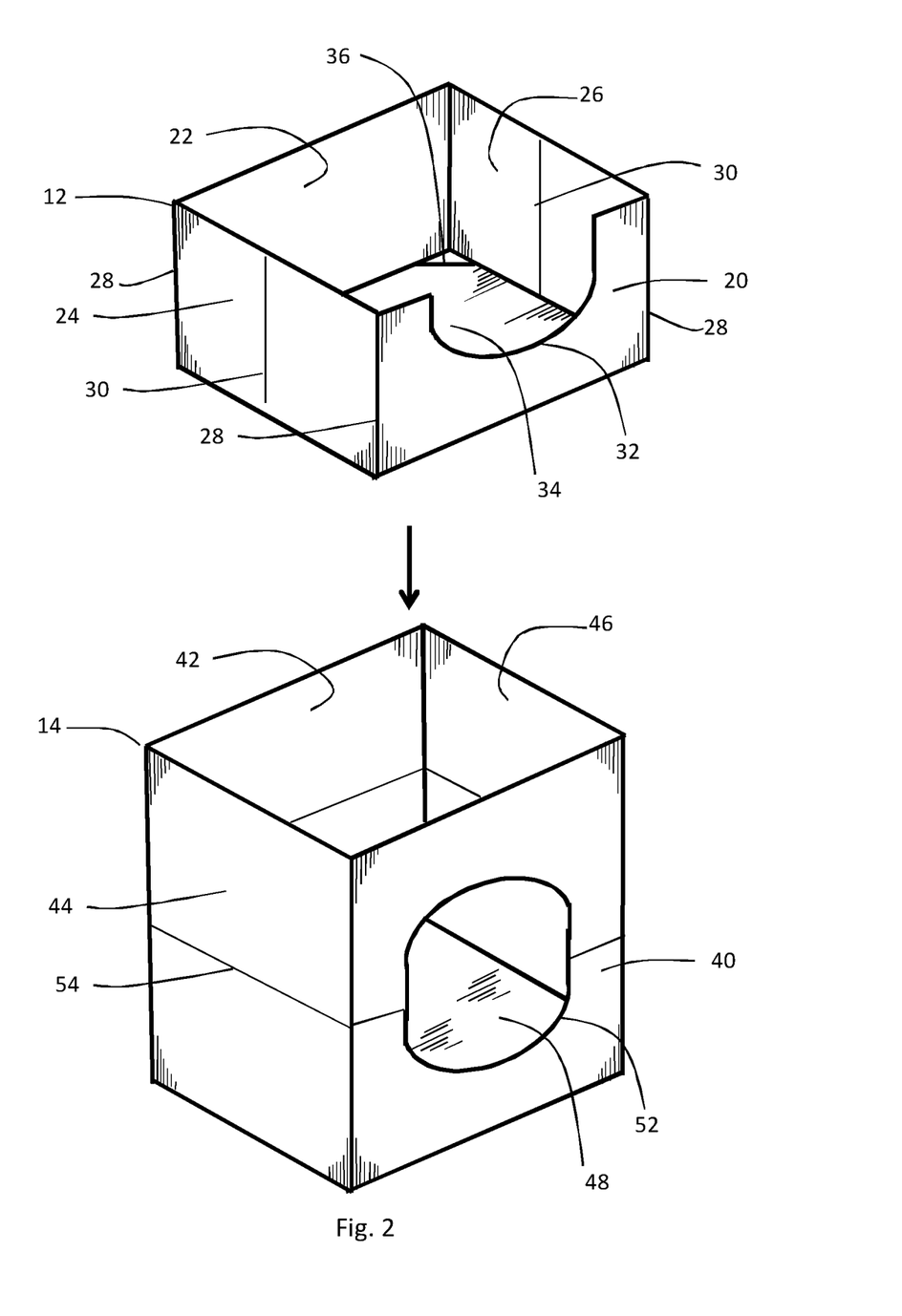
FIG. 2 shows an exploded view of the frame being installed with the cover.

The terms left and right, front and rear, and bottom and top are used for ease of illustration in explaining features appearing in the drawings and are not to be construed in a way to limit the disclosure. FIG. 1 shows an exploded view of the components of a pet bed 10 including a frame 12 (in a collapsed arrangement), a cover 14, a base 16, and a cushion 18. FIG. 2 shows the frame in a somewhat expanded arrangement. As will be explained below in greater detail, to allow the frame 12 to fit within the cover 14, the frame may be fully expanded once inserted in the cover. The frame 12 comprises front and rear walls 20,22, and left and right side walls 24,26. The left and right side walls 24,26, and the front and rear walls 20,22 may be formed from a light weight, rigid planar material, for instance, plastic, vinyl, corrugated paperboard, cardboard, plastic. The front and rear walls 20,22 may have a pivot connection 28 with each of the left and right side walls 24,26 at corners of the frame. By way of example, the connection of the front and rear walls 20,22 to the left and right side walls 24,26 may be via a live hinge, a line of weakness, or fold line, or may be via mechanical hinge, for instance, a piano type hinge. The left and right side walls 24,26 may have a similar type of wall pivot connection 30, for instance, a vertical fold line or live hinge between the connection with the front and rear walls. As shown in the drawings, the wall pivot connection 30 is centered in each of the left and right side walls. The left and right side wall pivot connection 30, e.g., fold line, may allow portions of the left and right side walls 24,26 to be pivoted inward, thereby allowing the pet bed to be moved between a collapsed and an expanded arrangement. In the collapsed arrangement, the front and rear walls 20,22 and the left and right side 24,26 walls may be pivoted about their respective pivot connections 28,30 in a manner such that the front and rear walls are brought adjacent to each other with the left and right side walls disposed therebetween. In the expanded position, the front and rear walls 20,22 and the left and right side walls 24,26 may be pivoted about their respective pivot connections 28,30 in a manner such that the front and rear walls may spaced apart from one another by the left and right side walls, and such that the left and right side walls are substantially planar and perpendicular to the front and rear walls. In the expanded arrangement, the front and rear walls 20,22, and the left and right side walls 24,26 define an interior of the frame. When the pet bed 10 is in the expanded arrangement, the front and rear walls 20,22, and the left and right side walls 24,26 each have an inward face into the interior of the frame and an outward face opposite the inward face that is exposed. FIGS. 1 and 7 show the pet bed 10 in a collapsed arrangement. FIGS. 3, 4, 5, and 6 show the pet bed in an expanded arrangement.

The front and rear walls 20,22, and the left and right side walls 24,26 each have a top and bottom edge. The top edge of the front wall may have a recess 32 to facilitate egress and ingress of the pet into the pet bed. Although not shown, the other walls may also have such a recess. The frame 12 also has a bottom 34 which is formed from a pliant material. The pliant material may be a fabric, non-woven polymer, or other collapsible or foldable type of material. For instance, the bottom 34 may be formed from a PVC or other liquid impervious liquid material, for instance, a plastic or vinyl sheet material. The bottom 34 may be attached to the bottom edges of the front and rear walls 20,22 and extend therebetween. The bottom may also be attached to the bottom edges of the left and right side walls and extend therebetween. The bottom 34 may have its corners 36 cut out to form an opening in the corners of the frame adjacent to the bottom edge. As will be explained below in greater detail, the cutout corners 36 may be used to allow the cover to be fastened to the pet bed. The pliant bottom 34 allows the frame to be collapsed when the front and rear walls 20,22 are brought adjacent to each other with the left and right side walls 24,26 disposed therebetween. In the collapsed arrangement of the pet bed 10, the bottom 34 may be folded between the front and rear walls 20,22, or folded against an outward face of either of the front and rear walls. The bottom has an inward face into the interior of the frame and an outward face opposite the interior face.

The pet bed cover 14 is configured to attach to and be released from the pet bed. Providing a releasably attachable cover 14 allows the cover to be removed from the pet bed and laundered. The releasably attachable cover 14 allows the cover to be replaced when worn or changed for decorative purposes. The cover may be formed from a pliant material, and may remain attached to the pet bed in either the collapsed or expanded arrangement. For instance, it is not necessary to remove the cover from the pet bed to move the pet bed from the expanded arrangement to the collapsed arrangement. As the cover 14 is made from a pliant material, the cover may conform to the frame 12 and be folded therewith when the frame is moved to the collapsed arrangement. The cover 14 may be formed from a quilted or padded material. The cover may have a front panel 40, a rear panel 42, and left and right side panels 44, 46 connected to each other to comprise a rectangular cross section, tube-shaped member. The cover's panels 40,42,44,46 may generally match with the respective front and rear walls 20,22, and the left and right side walls 24,26 of the frame. The cover may also have a bottom panel 48 which corresponds to the bottom 34 of the frame. When the cover 14 is formed as a tube with the bottom panel 48, the bottom panel extends across one end of the tube and the opposite end of the tube is left open to allow the frame 12 to be inserted in the cover with the outward face of the frame bottom 34 abutting the cover bottom panel 48. When the cover is formed as a tube without a bottom panel, the cover may be positioned around the frame or the frame may be inserted in the cover. The cover bottom panel 48 may have an outward face with non-skid material. The bottom panel 48 may also be formed from a liquid impervious material. The cover 14 may also have a pet access 52 opening corresponding to the recess 32 of the front, rear, left and/or right side walls, to allow access of a pet into the pet bed. As shown in the drawings, the pet access opening 52 of the cover is provided on the cover front panel 40 to correspond to the recess 32 of the frame front wall 20. While the cover is shown with left and right panels and front and rear panels that generally cover the entirety of each of the frame front, rear, left and right side walls, the cover may have less than four panels, so that, for instance, the cover may only cover one of the four walls, such as the front wall, the rear wall, a side wall; or two walls of the four walls, such as the front and rear wall, or the left and right side walls; or three of the four walls. The cover may also be configured to partially cover the inward face and/or outward face of a wall of the frame.

Figure 3:
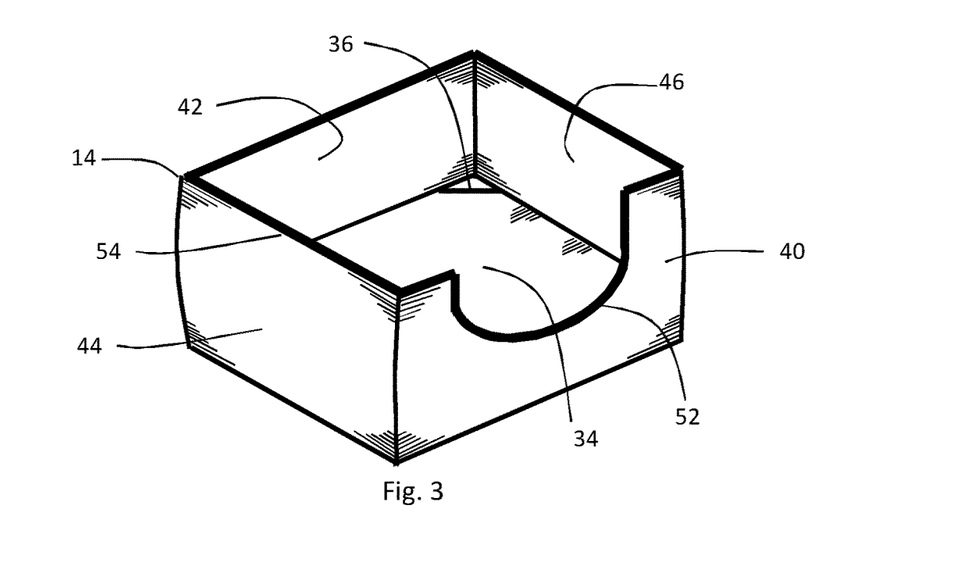
FIG. 3 shows the assembly of the cover and the frame.

FIG. 2 shows the cooperative relationship of the frame 12 and the cover 14. The cover 14 may be arranged with the cover bottom panel 48 resting on a support surface and the opposite open end extended upward to receive the frame 12. The frame 12 may be manipulated to an intermediate position between the expanded and collapsed arrangement of the frame to allow the frame to be inserted within the cover 14. The frame may be positioned such that the frame bottom 34 is adjacent the cover bottom panel 48 and the frame front and rear walls 20,22, and the frame left and right side walls 24,26 are positioned to be aligned with the cover front and rear panels 40,42, and the cover left and right side panels 44,46. With the frame 12 received in the cover 14 and resting on the support surface, the cover 14 may be folded over the top edges of the frame front and rear walls 20,22 and the frame left and right side walls 24,26. For purposes of facilitating the description that follows and to provide a visual aid in the drawings to illustrate the assembly of the cover 14 with the frame 12, a fold line 54 is shown on the cover of FIG. 2. As the cover 14 is made from a pliant material, the cover may easily fold over the top edge of the frame. For ease of illustration, as shown in the drawings, the cover fold line 54 corresponds with the vertical height of the frame such that when the frame is installed in the cover, the fold line corresponds to the top edges of the frame front and rear walls 20,22, and the frame left and right side walls 24,26. The cover 14 may be folded over the fold line 54 such that a portion of the cover extends over the inward face of the front and rear walls 20,22 and the left and right side walls 24,26. The cover 14 also extends over the outward face of the front and rear walls 20,22 and the left and right side walls 24,26. FIG. 3 shows further detail of the cover extending over the frame. The pet access opening 52 in the cover may be arranged to correspond with the recess 32 in the front wall 20.

Figure 4:
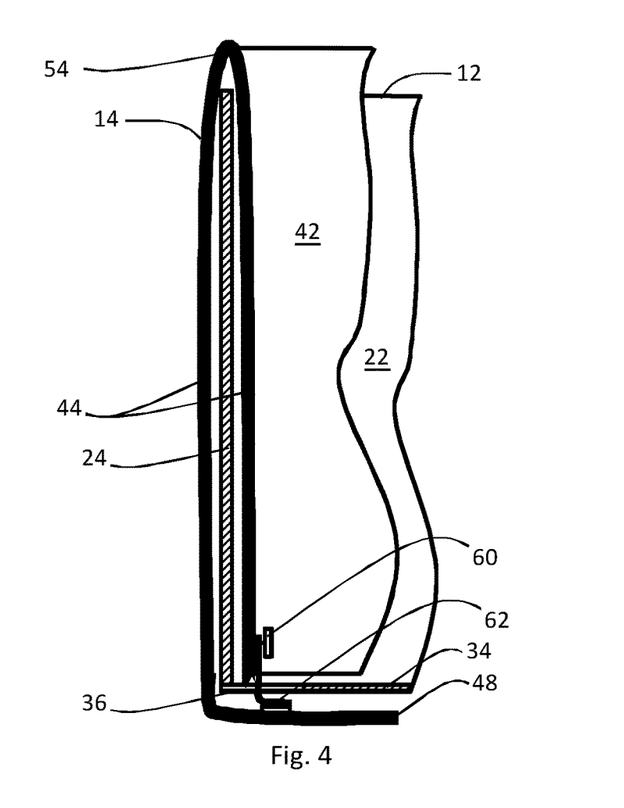
FIG. 4 shows a cross-sectional view of the cover installed around the frame providing detail of one manner in which the cover may be releasably attached to the pet bed.

FIG. 4 shows additional detail of one embodiment of releasably attaching the cover 14 to the pet bed. One or more of the panels 40,42,44,46 of the cover 14 may have a snap attachment 60 at its upper edge adjacent the open end of the cover opposite the bottom panel 48, and a complementary snap attachment 62 on the bottom panel. When the cover 14 is assembled with the frame 12, the complementary snap attachment of the cover bottom panel 48 may be arranged in the cut-out 36 of the bottom 34 of the frame. When the cover 14 is pivoted about the fold line 54 into the interior of the pet frame, the snap 60 on the upper edge of the cover 14 may be brought in close proximity to the cut-out 36 formed in the corner of the bottom 34 of the frame 12, and brought into register with the complementary snap attachment 62 of the cover bottom panel 48. The snap attachments 60,62 may be connected, thereby allowing the cover to be releasably attached to the pet bed. In this way, the cover may be attached to itself in removably attaching the cover to the pet bed. In the alternative, the frame may have mechanical fasteners on the inward and/or outward faces of the walls that cooperate with mechanical fasteners of the cover to allow the cover to be releasably attached to the pet bed, e.g. hook and loop material, snaps, hooks, clips, buttons and loops, ties, etc.

Figure 5:
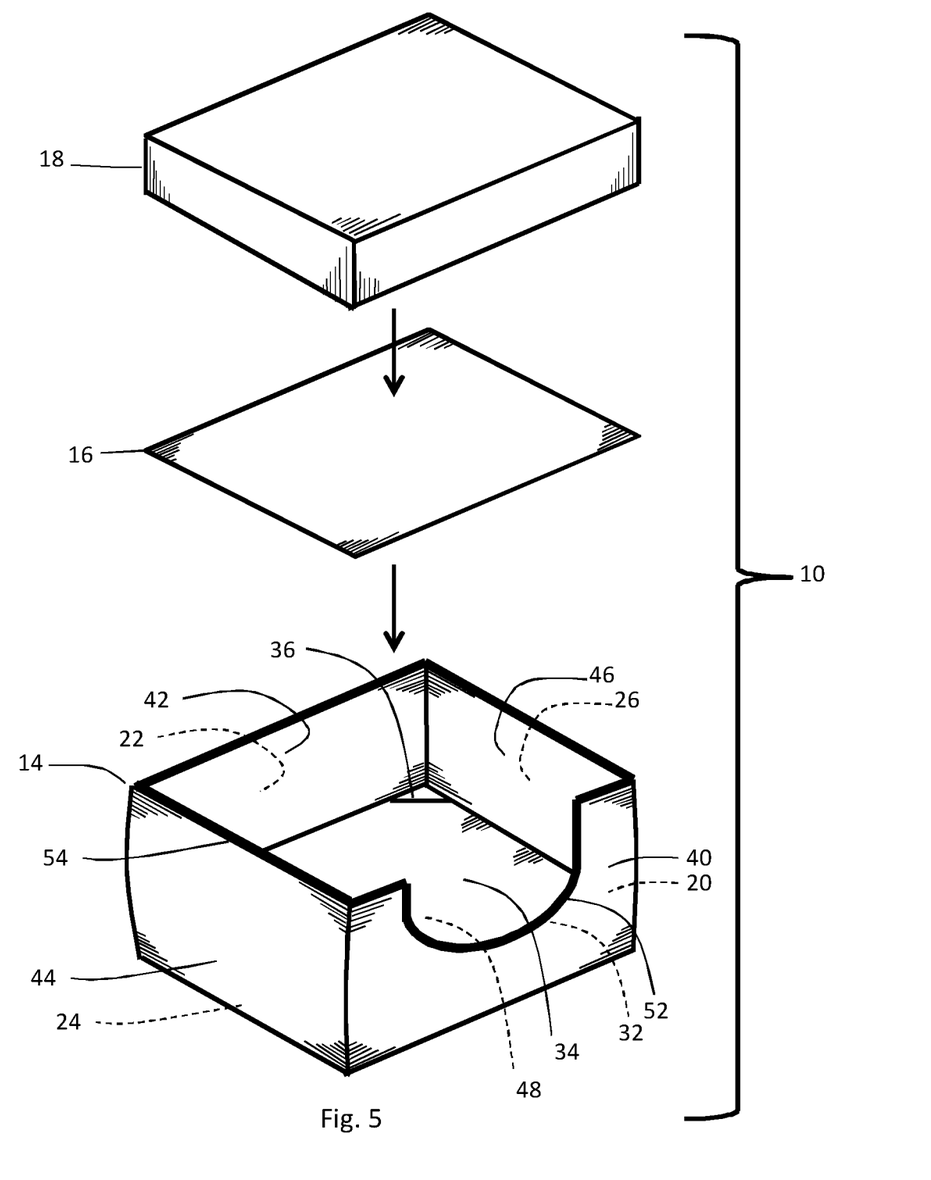
FIG. 5 shows an exploded view of the pet bed with the base and cushion being installed in an interior of the frame.

FIG. 5 shows an exploded view of the pet bed 10 including the base 16 and the cushion 18. To maintain the front and rear side walls 20,22, and the left and right side walls 24,26 in the expanded arrangement and generally perpendicular to each other, the base 16 may be inserted adjacent the frame bottom 34. The base 16 may be dimensioned so as to maintain the front and rear walls 20,22 in a spaced-apart relationship generally equal to the length of the left and right side walls 24,26. It is not necessary that the base extend between the left and right side walls although the base may to provide sufficient rigidity and maintain the left and right side walls and front and rear side walls in an upstanding, perpendicular manner. Likewise, it is not necessary that the base extend between the front and rear walls although the base may to provide sufficient rigidity and maintain the left and right side walls and front and rear side walls in an upstanding, perpendicular manner. The base may or may not have cut-outs in its corners corresponding to the cut-outs of the frame bottom. The cushion 18 may also be disposed in the interior of the frame to provide comfort for the pet. While the drawings show the cushion and base as separate components, the base may be integrated with the cushion.

Figure 6:
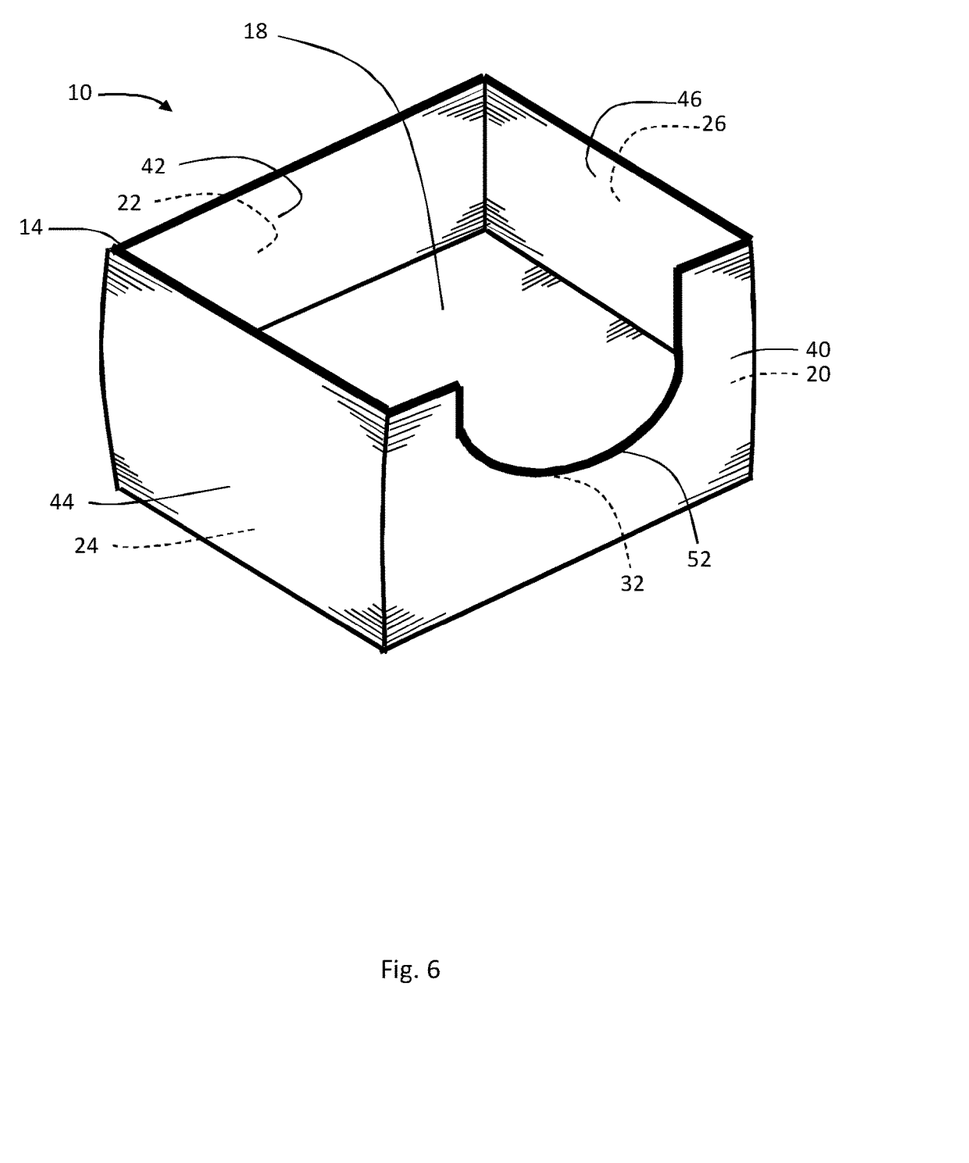
FIG. 6 shows the assembled pet bed of FIG. 5 with the cover extending around the frame, and the base and cushion installed in the interior of the frame.
Figure 7:
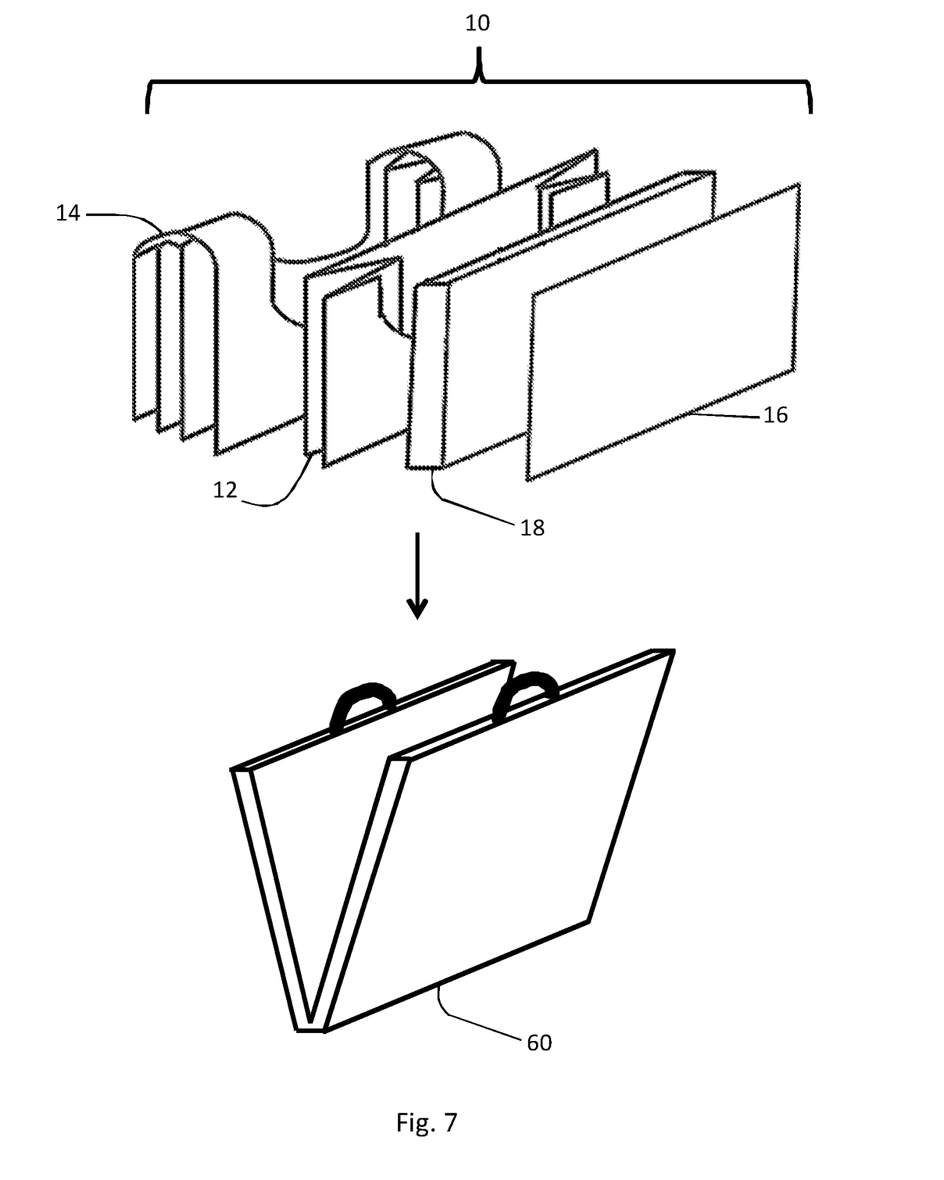
FIG. 7 shows the cover, the frame, the cushion, and the base in a collapsed, side-by-side arrangement prior to their insertion in a carrying tote.

FIG. 6 shows a fully assembled pet bed 10 with the cover 14 extending over the frame 12, and the cushion 18 and the base 16 inserted in the interior of the frame. To disassemble the pet bed 10, the components 12,14,16,18 may be removed in the order in which they were inserted. In other words, the cushion 18 may be removed from the interior of the frame, and then the base 16 may be removed from the interior of the frame. The cover 14 may be releasably attached from the pet bed to allow the frame 12 to be moved from the expanded arrangement to a partially collapsed arrangement, thereby allowing the frame to be removed from the cover through the cover opening. Once the frame 12 is removed from the cover opening, the frame may be moved to the fully collapsed arrangement. The cover 14 may then be folded for storage.

FIG. 7 shows an embodiment where the cover 14 is folded over itself so as to approximate the dimensions of the frame 12. The base 16 and the cushion 18 may also have dimensions which approximate that of the frame 12, thereby allowing the components 12,14,16,18 to be stacked side-by-side and compressed into a carrying tote 60 for portability.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A pet bed comprising:
a frame comprising:
a front and rear walls spaced apart from one another by left and right side walls, the front and rear walls and left and right side walls being formed from a rigid planar material, the front and rear walls and left and right side walls each having top and bottom edges; the front and rear walls each having a pivot connection with left and right side walls, the left and right side walls each having a wall pivot connection on the respective left and right side wall between the pivot connection of the left and right side walls and the front and rear walls; and
a bottom connected to the bottom edges of at least one of the front and rear walls and left and right side walls, together the bottom, the front and rear walls, and the left and right sidewalls defining an interior of the frame, and an inward face and an outward face of each of the front and rear walls and the left and right side walls;
a base being formed from a rigid material and extending between the front and rear walls disposed in the interior of the frame adjacent to the bottom; and
a cover being formed from a pliant material and configured to attach to and be released from the pet bed, wherein when the cover is attached to the pet bed, the cover is folded over the top edge at least one of the front, rear, left and right side wall so as to cover at least a portion of an inward face and at least a portion of the outward face of the at least one front, rear, left and right side wall; and
an attachment for releasably attaching the cover around the frame;
wherein when the cover is attached to the pet bed, the attachment passes through an opening in the bottom to releasably attach a portion of the cover on the inward face to another portion of the cover around the frame; and
wherein the base covers the opening in the bottom when the base is inserted into the interior of the frame.

2. The pet bed of claim 1 further comprising a cushion disposed in the interior of the frame adjacent to the base.

3. The pet bed of claim 1 wherein the cover comprises a tube shape.

4. The pet bed of claim 1 wherein at least one of the front wall, rear wall, left side wall, and right side wall has a recess formed in the top edge.

5. The pet bed of claim 4 wherein the cover has an opening such that when the cover is folded over the top edge of the at least one of the front wall, rear wall, left side wall, and right side wall, the opening aligns with the recess.

6. The pet bed of claim 1 wherein the base is removable from the interior of the frame.

7. The pet bed of claim 1 wherein the pet bed is collapsible in a manner such that the front and rear walls are brought adjacent to one another.

8. A pet bed comprising:
a frame comprising:
front and rear walls each having a pivot connection with left and right side walls, the front and rear walls and the left and right side walls being formed from a rigid planar material, the left and right side walls each having a wall pivot connection on the respective left and right side wall between the pivot connection of the left and right side walls and the front and rear walls, the front and rear walls and the left and right side walls each having top and bottom edges perpendicular to the pivot connections;
a bottom being formed from a pliant material and being connected to the bottom edges of at least one of the front and rear walls and left and right side walls;
wherein the frame is moveable between a collapsed arrangement and an expanded arrangement, wherein in the collapsed arrangement, the left and right side walls are pivoted about their respective wall pivot connections and pivoted about their respective pivot connections with the front and rear walls so that the front and rear walls are brought adjacent to each other with the left and right side walls disposed therebetween, wherein the expanded arrangement, the front and rear walls are spaced apart from one another by left and right side walls such that the bottom, the front and rear walls, and the left and right side walls define an interior of the frame, and an inward face and an outward face of each of the front and rear walls and the left and right side walls; and
a cover being formed from a pliant material and configured to attach to and be released from the pet bed, wherein when the cover is attached to the pet bed, the cover is folded over the top edge at least one of the front, rear, left and right side wall so as to cover at least a portion of an inward face and at least a portion of the outward face of the at least one top, rear, left and right side wall; and
an attachment for releasably attaching the cover around the frame, wherein when the cover is attached to the pet bed, the attachment passes through an opening in the bottom to releasably attach a portion of the cover on the inward face to another portion of the cover around the frame; and
a base formed from a rigid material, the base being insertable in the interior of the frame and supported by the bottom, the base being configured to abut at least one of the front and rear walls and left and right side walls to support the frame in the expanded arrangement, the base covering the opening in the bottom when the base is inserted into the interior of the frame.

9. The pet bed of claim 8 further comprising a cushion being insertable in the interior of the frame adjacent to the base when the frame is in the expanded position.

10. The pet bed of claim 8 wherein the cover comprises a tube shape.

11. The pet bed of claim 8 wherein at least one of the front wall, rear wall, left side wall, and right side wall has a recess formed in the top edge.

12. The pet bed of claim 11 wherein the cover has a pet access opening such that when the cover is folded over the top edge of the at least one of the front wall, rear wall, left side wall, and right side wall, the pet access opening aligns with the recess.

13. The pet bed of claim 8 wherein the cover extends over an outward face of the bottom when the cover is attached to the pet bed.

14. A method comprising:
providing a pet bed with a frame having front and rear walls and left and right side walls, the front wall being pivotally connected to each of the left and right side walls, and the rear wall being pivotally connected to each of the left and right side walls, the front and rear walls and left and right side walls being formed from a rigid planar material, the left and right side walls each having a wall pivot connection between the pivot connections of the front and rear walls with the left and right side walls, the front and rear walls and left and right side walls each having top and bottom edges perpendicular to the pivot connections, the pet bed further comprising a bottom being formed from a pliant material and being connected to the bottom edges of at least one of the front and rear walls and left and right side walls;

arranging the pet bed in an expanded arrangement by moving the left and right side walls about their respective wall pivot connections such that the walls are substantially planar and moving the front and rear walls about their respective pivot connections with the left and right side walls such that the front and rear walls are spaced apart from one another by the left and right side walls, with the bottom, the front and rear walls, and the left and right sidewalls defining an interior of the frame, and an inward face and an outward face of each of the front and rear walls and the left and right side walls;

inserting a base in the interior of the frame adjacent to the bottom; and applying a cover formed from a pliant material to the pet bed by folding the cover over the top edge of at least one of the front, rear, left and right side wall so as to cover at least a portion of the inward face and at least a portion of the outward face of the at least one top, rear, left and right side wall; and accessing an attachment and passing the attachment through an opening in the bottom to releasably attach a portion of the cover on the inward face to another portion of the cover around the frame;

wherein the step of inserting the base in the interior of frame includes positioning the base in the interior against the bottom and against at least one of the front and rear walls and left and right side walls to support the frame in the expanded arrangement, and positioning the base in the interior to cover the opening in the bottom.

15. The method of claim 14 further comprising inserting a cushion in the interior of the frame.

16. The method of claim 14 further comprising arranging the pet bed in a collapsed position by pivoting the left and right sidewalls about their respective wall pivot connections and moving the front and rear walls about their respective pivot connections with the left and rights side walls such that the front and rear walls are brought adjacent to one another with the left and right side walls disposed therebetween.

17. The method of claim 16 further comprising arranging the bottom adjacent to the outward face of one of the front and rear walls.

18. A pet bed comprising:

a frame comprising front and rear walls spaced apart from one another by left and right side walls, the front and rear walls and left and right side walls being formed from a rigid planar material, the front and rear walls and left and right side walls each having top and bottom edges, the front and rear walls and left and right side walls defining an interior of the frame, and an inward face and an outward face of each of the front and rear walls and the left and right side walls; the front and rear walls each having a pivot connection with left and right side walls, the left and right side walls each having a wall pivot connection on the respective left and right side wall between the pivot connection of the left and right side walls and the front and rear walls;

a cover being formed from a pliant material and configured to attach to and be released from the pet bed, wherein when the cover is attached to the pet bed, the cover is folded over the top edge at least one of the front, rear, left and right side wall so as to cover at least a portion of an inward face and at least a portion of the outward face of the at least one front, rear, left and right side wall;

an attachment for releasably attaching the cover around the frame, wherein when the cover is attached to the pet bed, the attachment passes adjacent to the bottom edge of the at least one of the front, rear, left and right side wall to releasably attach a portion of the cover on the inward face to another portion of the cover around the frame; and a base formed from a rigid material, the base being insertable in the interior of the frame and supported by the bottom, the base being configured to abut at least one of the front and rear walls and left and right side walls to support the frame in the expanded arrangement, the base covering the attachment when the base is inserted into the interior of the frame.

19. The pet bed of claim 18 further comprising a cushion disposed in the interior of the frame.

20. The pet bed of claim 19 wherein the base and cushion are integral.

21. The pet bed of claim 18 wherein each of the front and rear walls has a pivot connection with the left and right side walls, the left and right side walls each having a wall pivot connection on the respective left and right side wall between the pivot connection of the left and right side walls and the front and rear walls.

22. The pet bed of claim 18 wherein the cover comprises a tube shape.

* * * * *